United States Patent
Weimerskirch

(10) Patent No.: US 7,194,617 B2
(45) Date of Patent: Mar. 20, 2007

(54) METHOD AND APPARATUS TO PREVENT THE UNAUTHORIZED COPYING OF DIGITAL INFORMATION

(75) Inventor: André Weimerskirch, Eppstein (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 768 days.

(21) Appl. No.: 09/992,924

(22) Filed: Nov. 5, 2001

(65) Prior Publication Data

US 2003/0088775 A1    May 8, 2003

(51) Int. Cl.
- H04L 9/00 (2006.01)
- H04L 9/32 (2006.01)
- G06F 11/30 (2006.01)
- G06F 12/14 (2006.01)
- G06F 11/00 (2006.01)
- G06F 7/39 (2006.01)
- G11C 11/34 (2006.01)
- H03K 19/173 (2006.01)

(52) U.S. Cl. ............... 713/155; 713/193; 713/194; 714/736; 714/746; 365/185; 365/200; 380/265; 380/44; 326/37; 326/38; 326/39

(58) Field of Classification Search ............... 713/155, 713/176, 161, 193; 380/54, 232, 269; 705/57; 369/32, 47, 53
See application file for complete search history.

(56) References Cited

U.S. PATENT DOCUMENTS

| | | | | |
|---|---|---|---|---|
| 5,930,209 A | * | 7/1999 | Spitzenberger et al. | 369/30.05 |
| 6,081,897 A | * | 6/2000 | Bersson | 713/200 |
| 6,490,683 B1 | * | 12/2002 | Yamada et al. | 713/176 |
| 6,560,179 B2 | * | 5/2003 | Park et al. | 369/53.21 |
| 6,591,365 B1 | * | 7/2003 | Cookson | 713/176 |
| 6,611,607 B1 | * | 8/2003 | Davis et al. | 382/100 |
| 6,865,676 B1 | * | 3/2005 | Staring et al. | 713/176 |
| 2001/0024411 A1 | * | 9/2001 | Pirot et al. | 369/53.21 |
| 2001/0054144 A1 | * | 12/2001 | Epstein et al. | 713/161 |
| 2002/0001277 A1 | * | 1/2002 | Thomas | 369/59.21 |
| 2003/0065621 A1 | * | 4/2003 | Kambayashi et al. | 705/57 |

OTHER PUBLICATIONS

U.S. Appl. No. 09/537,815 entitled "Protecting Content From Illicit Reproduction By Proof Of Existence Of a Complete Data Set" filed Mar. 28, 2000.
U.S. Appl. No. 09/537,079 entitled "Protecting Content From Illicit Reproduction By Proof Of Existence Of a Complete Data Set Via A Linked List" filed Mar. 28, 2000.
U.S. Appl. No. 09/536,944, Epstein et al.
U.S. Appl. No. 09/536,945, Epstein et al.
U.S. Appl. No. 09/537,079, Staring et al.
U.S. Appl. No. 09/573,815, Epstein.
U.S. Appl. No. 09/747,513, Hars.

* cited by examiner

Primary Examiner—Ayaz Sheikh
Assistant Examiner—Shin-Hon Chen
(74) Attorney, Agent, or Firm—Edward W. Goodman; Paul Im

(57) ABSTRACT

A method for authorizing the rendering of a digital recording. A first section and a last section of a track is first identified. A watermark is then decoded from the first and last sections of the track. It is then determined if at least one reserved bit is marked in the watermark in each of the first and last sections of the track. If so, it is determined if the sequence IDs of sections interposed between the first and last sections of the track are in sequential order. If both conditions are met, the rendering is authorized.

2 Claims, 2 Drawing Sheets

METHOD AND APPARATUS TO PREVENT THE UNAUTHORIZED COPYING OF DIGITAL INFORMATION

FIELD OF THE INVENTION

This invention relates primarily to the field of consumer electronics, and in particular to the protection of copy-protected content material.

BACKGROUND OF THE INVENTION

Generally, optical discs and other digital storage media are widely used throughout the world because of their capacity to store and read information. In an optical disc, such as a compact disc (CD), a digital information signal is recorded on one surface and the recorded information is reproduced using a laser beam to pick up the digital signal.

The technology associated with the CD has been expanded to cover other areas such as storing digitized audio, video and alphanumeric information for a variety of purposes, conforming to a number of standards such as digital video disc (DVD), CD-ROM (read only memory), MP3 (Motion Picture Experts Group, Audio Layer 3), etc. (Although reference is generally made to CDs, it is understood that the description and invention generally applies to any optical disc.)

With regard to MP3, the MP3 format for storing and transmitting compressed audio files has made the wide-scale distribution of audio recordings feasible, because a 30 or 40 megabyte digital audio recording of a song can be compressed into a 3 or 4 megabyte MP3 file. Using a typical 56 kbps dial-up connection to the Internet, this MP3 file can be downloaded to a user's computer in a few minutes. Thus, an unauthorized malicious party may read songs from an original and legitimate CD, encode the songs into MP3 format, and place the MP3 encoded song on the Internet for wide-scale illegitimate distribution. Alternatively, the unauthorized malicious party could provide a direct dial-in service for downloading the MP3 encoded song. The illicit copy of the MP3 encoded song can be subsequently rendered by audio playback devices, or can, for example, be decompressed and stored onto a recordable CD for playback on a conventional CD player.

A group by the name of Secured Digital Music Initiative (SDMI) has been established by record companies to protect music companies' copyrights on the Internet by providing disc forgery prevention techniques. SDMI was also founded by the Recording Industry Association of America (RIAA); the initiative has the support of major labels such as Universal, EMI, Sony and Time Warner.

The Secure Digital Music Initiative (SDMI) and others advocate the use of "Digital Watermarks" to identify authorized content material. As in its paper watermark counterpart, a digital watermark is embedded in the content material so as to be detectable, but unobtrusive. An audio playback of a digital music recording containing a watermark, for example, will be substantially indistinguishable from a playback of the same recording without the watermark. A watermark detection device, however, is able to distinguish these two recordings based on the presence or absence of the watermark.

An accurate reproduction of watermarked material will cause the watermark to be reproduced in the copy of the watermarked material. An inaccurate, or lossy reproduction of watermarked material, however, may not provide a reproduction of the watermark in the lossy copy of the material.

A number of protection schemes, including those of the SDMI, have taken advantage of this characteristic of lossy reproduction to distinguish legitimate material from illegitimate material, based on the presence or absence of an appropriate watermark. In the SDMI scenario, two types of watermarks are defined: "robust" watermarks, and "fragile" watermarks. A robust watermark is one that is expected to survive a lossy reproduction that is designed to retain a substantial portion of the original content material, such as an MP3 encoding of an audio recording. That is, if the reproduction retains sufficient information to allow a reasonable rendering of the original recording, the robust watermark will also be retained. A fragile watermark, on the other hand, is one that is expected to be corrupted by a lossy reproduction or other illicit tampering.

In the SDMI scheme, the presence of a robust watermark indicates that the content material is copy protected, and the absence or corruption of a corresponding fragile watermark when a robust watermark is present indicates that the copy protected material has been tampered with in some manner. An SDMI compliant device is configured to refuse to render watermarked material with a corrupted or absent fragile watermark, except if the corruption or absence is justified by an "SDMI-certified" process, such as an SDMI compression of copy protected material for use on a portable player. For ease of reference and understanding, the term "render" is used herein to include any processing or transferring of the content material, such as playing, recording, converting, validating, storing, loading and the like.

An SDMI-compliant device has been envisioned that allows an owner of a digital recording, such as a CD, to make only four digital copies, based on detected robust and fragile watermarks, of an original CD per copying session. In addition, the SDMI-compliant device does not allow a copy of the CD to be re-copied, if there is an absence or corruption of a fragile watermark when a robust watermark is present. Further, after the four digital recordings of the original CD (or songs contained thereon) has been met, the SDMI-compliant device will allow a user to copy a section of a track from the original CD of approximately 15 seconds or less. The 15 seconds section of a track may be imported, recorded onto a recordable CD, transmitted over the Internet in the form of an MP3 file, etc.

However, by allowing such a sampling section to be recorded even after the recording limit was reached, the potential for avoiding the 4 song-recording minimum was opened. For example, a song could be imported in 15-second sections, each section individually identified as a separate song or track and including a TOC (Table of Contents). Each section would then be imported and rendered as a sequence of 15 second "songs", thus piecing together the original song.

SUMMARY OF THE INVENTION

To prevent the scenario of piecing together a song with sequences of track sections re-cast as separate "song", one approach would be that the SDMI compliant device insert, for example, a 2 second gap between each imported song. Thus, if the original song or track is pieced together from imported 15-second sections, a 2 second gap will occur in every 15 seconds of the song. This effectively prevents such illegitimate copying of songs. Such a system is described in U.S. patent application Ser. No. 09/747,513, entitled "System and Method For Inserting Disruptions Into Merged Digital Recordings" for Laszlo Hars, filed Dec. 20, 2000

(Attorney Docket US000401), the contents of which are hereby incorporated by reference.

While the insertion of a 2 second gap is an effective solution to prevent such illegitimate importation, a potential drawback exists in certain instances where the user may be making legitimate copies (for example, making one of the four allowed copies). In many instances, such as live performances recorded on a CD, the music continues from one track to the next without any time gap. As a particular example, on a live CD by the Grateful Dead, the song "China Cat Sunflower" may segue seamlessly into "I Know You Rider", even though they are identified on the CD as separate tracks. However, a user who is making an authorized recording of the CD would have a 2 second gap inserted between the two tracks. The gap may thus alter the authorized recorded version of the CD for the user.

Therefore, there also exists a need for an apparatus and a method that may be used to prevent a medium from being copied a certain number of times and does not force a user who has legally recorded tracks to listen to gaps in a medium. It is also desirable that the apparatus and method be compatible with SDMI and like standards. For example, in addition to being used in preventing in excess of a number of recordings, it is desirable that sections of the medium of up to a pre-determined number of seconds, for example, 15 seconds may be imported, rendered and recorded even if the number of authorized recordings has already been met.

Therefore, the focus of the invention is to provide a system that prevents the unauthorized importing of digital audio recording without inserting a time gap between songs.

It is a further object of the present invention to provide a method and system that allows a segment of a track on the order of, for example, 15 seconds, to be imported even if the number of authorized copies of the medium or track have been met.

It is yet a further object of the invention to provide a system and apparatus that performs the above in compliance with the SDMI protocol.

To achieve the above objects, there is a system for producing an original recorded medium that provides a watermark having special bits incorporated therein. The special bits are incorporated in the watermark so that at least one special bit is marked in a first section of the track and the last section of the track for each track or song of the medium or other original recording. The invention also includes a medium or other original recording having a watermark that includes the special bits as so positioned.

The invention also includes a system or device that records or renders data originating from a medium or other original recording or a track of a medium or other original recording by first determining where a first and last section of the track, having a watermark, are located; decoding the watermark from the track; determining whether at least one special bit is marked in the first and last sections of each track; and also determining whether the interposed sequence IDs in the track have the proper order between the first and last sections of the track. If not, then recording or rendering is prevented.

The recording or rendering device or system allows authorized copying or rendering of an authorized copy, prevents piecing together a song using smaller sections, and does not insert an artificial gap between tracks in order to do so. It is also compatible with the SDMI protocol. If a track is authorized to be rendered, then the at least one special bit will be detected in the first and last sections of the track and the interposed sequence IDs will be in order. Thus, the rendering will be authorized.

If, on the other hand, the rendering is not authorized (for example, the limit has been exceeded as evidenced by a corruption of fragile watermarks in a number of sections of the song), and a user attempts to record or render a song using 15-second sections masked as "songs" (i.e., each having an associated TOC), then the at least one special bit will not be found in the first and last sections of the track or song. Nor will it find the correct sequence IDs interposed between the first and last sections of the track. Thus, there is no need for a 2 second gap imposed between tracks to prevent unauthorized copying, because the recording is denied before any importation or recording even occurs.

BRIEF DESCRIPTION OF THE DRAWINGS

The above and other objects, features, and advantages of the present invention will become more apparent in light of the following detailed description of an exemplary embodiment thereof taken in conjunction with the attached drawings in which.

DESCRIPTION OF THE PREFERRED EMBODIMENT

Figure 1:
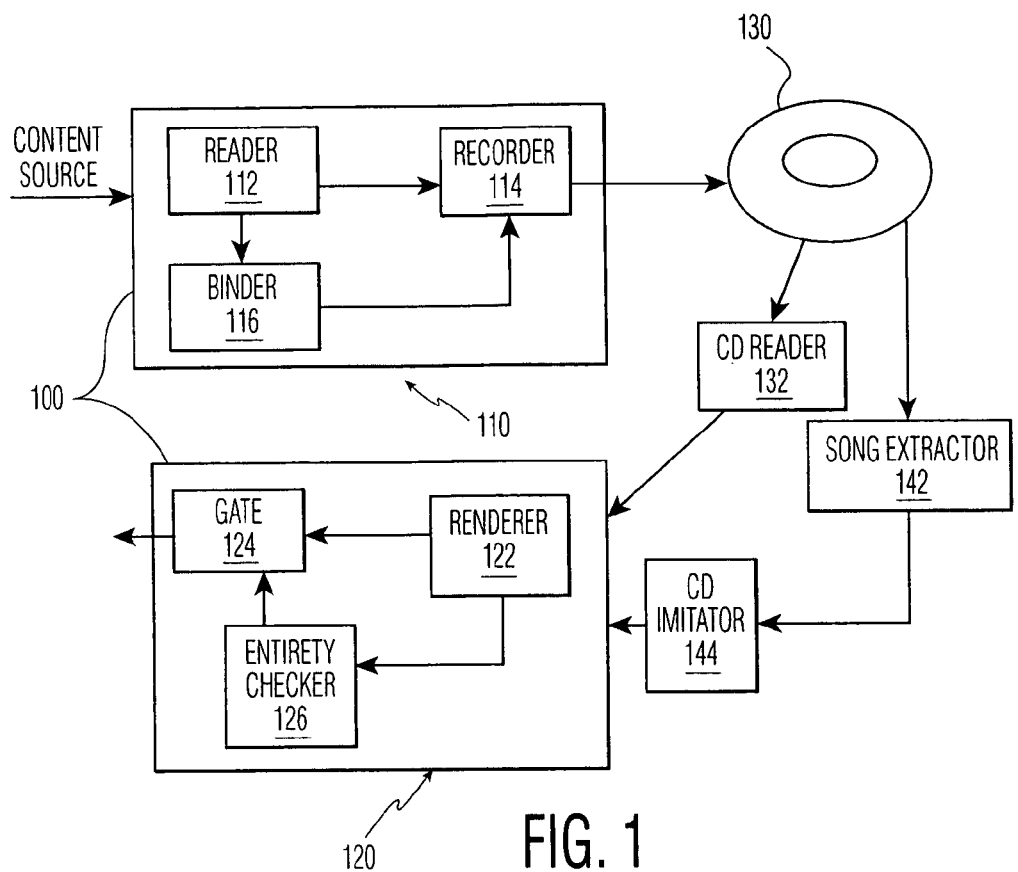
FIG. 1 illustrates a block diagram of a system in accordance with one embodiment of the present invention.

Turning now to the drawings, in which like reference numerals identify similar elements throughout the several views, and commonly known components and functions are omitted to avoid obscuring the invention.

FIG. 1 illustrates an example block diagram of a protection system 100 in accordance with this invention. The protection system 100 comprises an encoder 110 that encodes content material onto a medium 130, and a decoder 120 that renders the content material from the medium 130 and is discussed in greater detail in copending U.S. application Ser. No. 09/536,944 entitled, "Protecting Content from Illicit Reproduction by Proof of Existence of a Complete Data Set via Self-Referencing Sections", filed on Mar. 28, 2000 for Inventors Michael A. Epstein, Antonius A. M. Staring and Martin Rosner, the contents of which are hereby incorporated by reference.

Encoder 110 receives music data of a content source to reader or selector 112. A binder 116 extracts portions of the content data from reader and attaches a watermark thereto. The term "watermark" referred to in this application is defined as a robust, watermark, fragile watermark or any type of watermark that can be rendered, stored and recorded by a CD reader or optical disc device. The watermark is mixed with the content data (in this case, an audio signal) to provide a decodable and identifiable data structure, such as that shown in FIG. 2. The watermark data is provided so that it does not effect the audio quality of the content material. Encoder 110 includes a recorder 114 that records the content material from the reader 112 and the content material and watermark from the binder 116 onto the medium 130.

Figure 2:
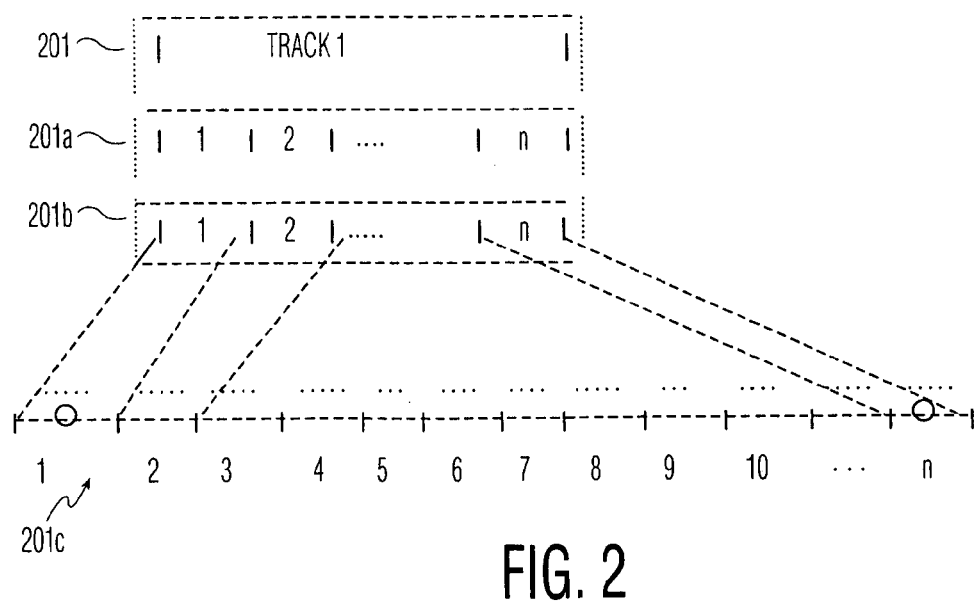
FIG. 2 illustrates a data portion of an audio recording in accordance with one embodiment of the present invention.

Referring to FIG. 2, there is an illustration of a track that includes a representation of a recorded data structure, such as that recorded by recorder 114 onto medium 130, of FIG. 1, in accordance with the present invention. Data is stored in the form of a track 201, which may represent, for example, one song recorded on a CD. The recorded data on the track 201 comprises watermark data 201a and music data 201b. Although the watermark data 201a and music data 201b are depicted separately in FIG. 2, it is understood that these data items are mixed (for example, by binder 116 and recorder 114 of FIG. 1) and stored together on the track in digital format. As noted, the watermark data 201a does not interfere with the audio playback, and may be extracted from the track (via a decoder for example) to provide for authentication discussed below. Those of ordinary skill in the art recognize that the track may contain more information than the information recited above.

As noted, the watermark data 201a and music data 201b comprising track 201, although depicted separately in reference numbers 201a and 201b, are mixed and recorded together on the track. An enhanced representation of track 201 is shown as track 201c in FIG. 2. As shown in the representation of track 201c, the track is divided into a sequence of track sections 1, 2, ..., n. (These track sections are also represented in the depictions of watermark data 201a and music data 201b.)

Each track section is a particular length of time, for example, approximately 15 seconds. Thus, if a track is a song that is 3:00 minutes long, it may be comprised of twelve 15-second track sections. (Those of ordinary skill in the art will recognize that a track may be longer or shorter than three minutes and that the track sections may be longer or shorter than 15 seconds.) Much of each track section 1, 2, ..., n is comprised of the mixed music and watermark data. However, each section may also include other control and identification data. In particular, each of the n sections of track 1 (as well as other tracks and track sections) includes three related data elements: 1) CDID (Compact Disc Identification) or unique identifier which is the same for all sections on a CD (or album), or all other storage medium 2) a track number, and 3) a section identifier (sequence IDs). These data fields are described in more detail in above-cited copending application "Protecting Content from Illicit Reproduction by Proof of Existence of a Complete Data Set via Self-Referencing Sections." Thus, the combination of track number and sequence IDs for each track section uniquely identifies every section on the album.

The watermark encoded on each track section (having sequence IDs 1, 2, ..., n) of the track 201b has at least one reserved or special bit. For example, if there are 50 data bits in the watermark of each track section, the $8^{th}$ bit may be reserved for the special bit. The special bit is marked (for example, given value "1") in the first and last (nth) track section of the track and not marked (for example, given value "0") in the other track sections 2, 3 ..., n−1. As noted above, the track of FIG. 2 is formatted by the binder 116 and recorder 114 of encoder 110 of FIG. 1 and recorded onto medium 130. There may of course, be multiple tracks of like structure recorded. Those of ordinary skill in the art also recognize that the track may be "burned", transferred, copied or placed on a medium such as a CD by other sources than those shown in FIG. 1. In addition, those of ordinary skill in the art recognize that the watermarks embedded with special bits, sequence IDs, etc. may be in any part of the watermark, such as the CDID or track number.

Referring back to FIG. 1 decoder 120 in accordance with this invention comprises a renderer 122 and a gate 124 that is controlled by an entirety checker 126 discussed in the above-cited copending U.S. Application "Protecting Content from Illicit Reproduction by Proof of Existence of a Complete Data Set via Self-Referencing Section." Renderer 122 includes software that checks, for example, whether the special bit is marked in the appropriate sections and other authentication checking in accordance with the invention, as described further below. Entirety checker 126 may sample the sections of the CD to determine if other random sections of the album are present and consistent with the track being rendered and, if not, deny rendering. Gate 124 outputs the rendered signal, if authorized.

CD Reader 132 in FIG. 1 is used in the description below to represent a downloading for rendering of a track that is authorized under the SDMI or like protocols. Thus, CD reader 132 may download a track comprised of track sections 1, 2, ..., n as shown in FIG. 2 and described above from a CD 130. CD reader 132 may also download for rendering multiple tracks formatted as shown in FIG. 2.

In a representation of a potential system for unauthorized copying, song extractor 142 extracts a song from the medium 130 and communicates it to an example CD imitator 144, representative of a possible illicit download of the song via the Internet. The CD imitator 144 represents, for example, a software program that provides information in response to a conventional CD-read command. Alternatively, the information received from the song extractor can be written to a CD medium, and provided to the conventional CD reader 132.

For purposes of the description, it is assumed that song extractor 142 includes software that attempts to evade the SDMI or like protocols. For example, song extractor 142 may convert the track downloaded from the medium 130 into a compressed (e.g., MP3) file, which will corrupt a fragile watermark. Alternatively, the song extractor 142 may attempt to avoid the number of recordings authorized by the protocol (four for SDMI). In this case, the song extractor 142 may download individual track sections of each track and mask each individual track section as a separate track or "song" in an associated TOC. If each track section is less than 15 seconds, such importing is authorized by an SDMI system. The CD imitator 144 will place the track sections masked as separate tracks back-to-back for rendering, thus piecing together the original track as a compilation of 15 seconds masked tracks (i.e., track sections).

Figure 3:
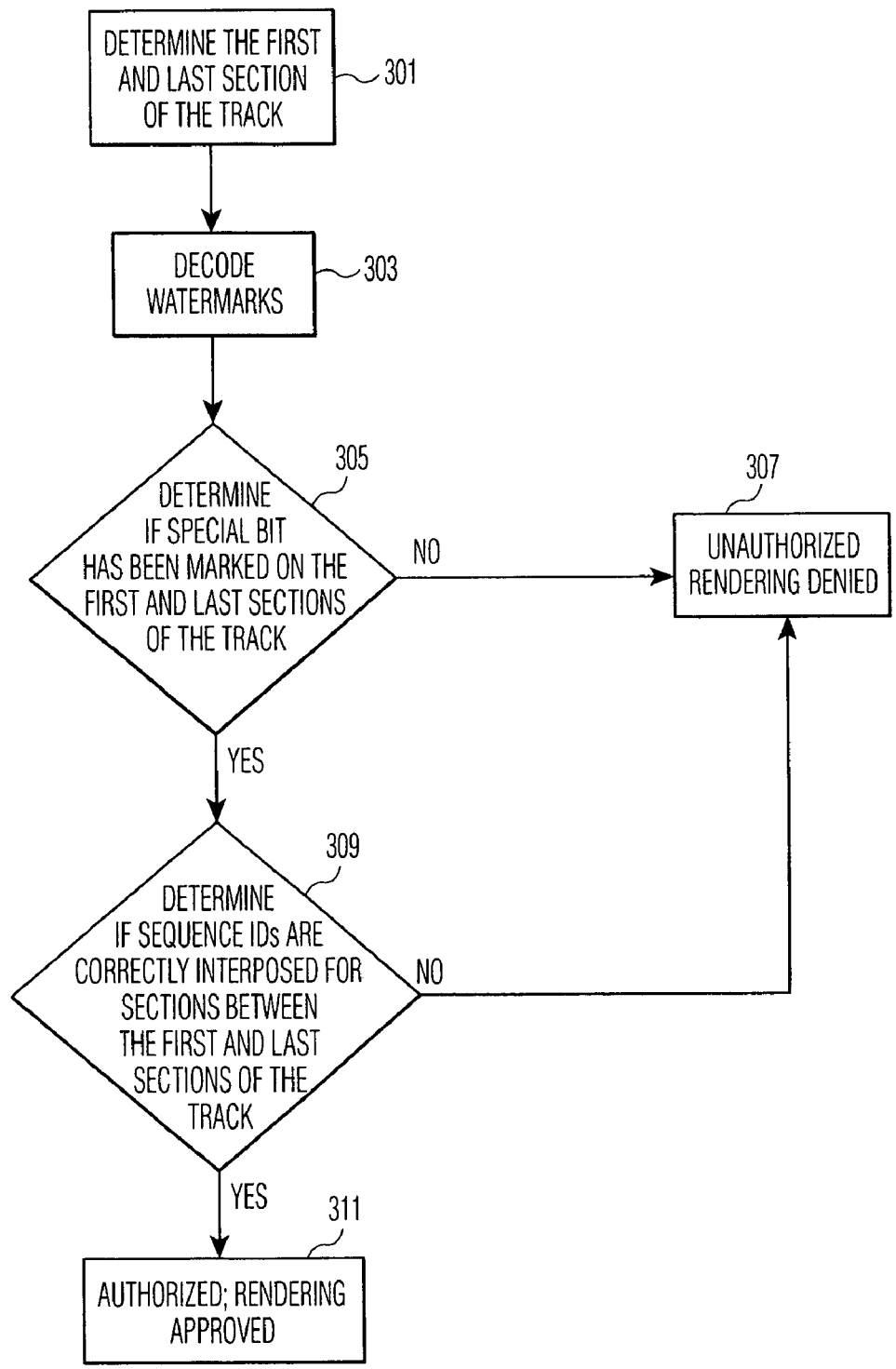
FIG. 3 illustrates a flow-chart of the process for protecting an audio recording in accordance with one embodiment of the present invention.

Referring to FIG. 3, there is a flow chart that illustrates an embodiment of the invention as performed by the software or renderer 122, which will prevent such unauthorized rendering. The renderer 122 receives a data stream from the CD reader 132 or CD imitator 144. In step 301, a first (1) section and a last (n) section such as shown in FIG. 2, are identified in the data stream. For example, reader 132 utilizes a software-processing portion that recognizes the beginning and end of a track of medium 130 as given in the TOC area of the CD, reader 132 selects a track and downloads it to decoder 120.

The first (1) and last (n) sections of the track may be identified using the sequence ID number field present in each section, which will identify section 1 and section n, as noted above. In step 303, the data for the first and nth sections are decoded and the watermark data is extracted. The special bits reserved in the watermark of each of the first and nth section of the track is examined to see if it is marked in step 305 (for example, have logic level "1"). If not then rendering is denied, (step 307).

As described further below, the medium may not have a marked robust or fragile watermark with at least one special bit on the first (1) and last (n) sections of a track, because (for example), a system (such as the song extractor 142 and CD imitator 144) has re-cast the track data in an attempt to reproduce a track in excess of the allotted four times.

In step 309, it is determined if the sequence IDs of the track sections 2, 3, . . . , n−1 interposed between the first (1) and last (n) sections of the track are present and in the correct sequence. If the proper order of sequence IDs interposed between the first (1) and last (n) sections of the track is not found, the rendering is denied in step 307. If it is determined that the sequence IDs are interposed between the first and last sections of the track are in the proper order, then rendering is authorized in step 311. If the track is authorized for rendering, then the track may be played, "burned," transferred, etc.

The processing of FIG. 3 may be repeated for subsequent tracks provided from the medium 130, for example, an entire CD. If any particular track of a CD is unauthorized, however, the rendering of any further tracks may be denied.

Referring back to FIG. 1, if a CD reader 132 supplies a track that has the format as shown in FIG. 2, then the renderer 122 will find the special bits marked on the first and last (nth) track section of the track ("yes" in decision block 305 of FIG. 3) and will also find that the sequence IDs for track sections 2, 3, . . . , n−1 are in the proper order ("yes" in decision block 309). Thus, the rendering will be authorized (at least preliminarily) in step 311. It is noted that the decoder 120 may still deny rendering. For example, if the entirety checker 126 determines that sections of the watermark have been corrupted or do not exist (for example, because it is a bootleg or has been recorded more than four times in the SDMI domain), then the rendering is denied.

As noted, the song extractor 142 and CD imitator 144 is used to describe how the processing of FIG. 3 avoids attempts to thwart unauthorized copying. For example, in the SDMI domain, where the four recording maximum has been met, the fragile watermarks will be degraded and will not pass the entirety checker. As noted above, the song extractor 142 may attempt to avoid the number of recordings authorized by the protocol (four for SDMI). In this case, the song extractor 142 may download individual track sections (such as track sections 1, 2, . . . , n in FIG. 2) of each track and mask each individual track section as a separate track or "song" in an associated TOC. If each track section is less than 15 seconds, such importing is otherwise authorized by an SDMI compliant system. Once inside the SDMI domain any device including the SDMI compliant system will play the tracks in any order. Thus, one can place the track sections as separate tracks back-to-back for rendering, and thus piece together the original track as a compilation of such track sections.

However, because each such track section is masked as a separate track, the renderer 122 of the invention will process the masked track section as a track using the processing of FIG. 3. Thus, for each track section masked as a track, it will attempt to find a special bit marked in the first and nth track section of the "track" (i.e., the masked track section) in step 305. For the first track section, it will find a special bit in step 305. In general, the renderer will allow a song having a single track section and only one bit therein to be rendered as special cases of steps 305 and 309, since there may be instances of a very short song (of 15 seconds or less). Thus, the first track section will pass step 305. However, the track sections after the first section (and before the nth section) that are presented as a separate track will fail in step 305, since they will not have a marked special bit. The nth section, like the first section, will generally pass step 305.

Thus, because tracks sections 2, 3, . . . , n−1, when masked as separate tracks, do not advance beyond step 305 before rendering is denied, unauthorized importing of a track by masking individual track sections is prevented. At most, only the first and last track sections (that is, the first and last 15 seconds of the song) are rendered. For all intents and purposes such a pieced together "song" is worthless. By using this technique, there is no need for inserting time gaps between imported tracks, which, as noted above, may on occasion insert undesired gaps during authorized rendering and recording of original tracks.

It is noted that, in the above discussion, the sequence IDs of the track being focused on were numbered 1, 2, . . . , n. Where a medium, such as a CD, includes a number of tracks, the sequence ID may increase in sequence from the first track section of the first track to the last track section of the last track. Thus, for example, the first track may have sequence IDs of 1, 2, . . . , n. In that case, the second track will have sequence IDs of n+1, n+2, . . . n+m, where m is the number of track sections in the second track. Likewise the third track will have sequence IDs that begin with n+m+1, and so on.

Although illustrative embodiments of the present invention have been described herein with reference to the accompanying drawings, it is to be understood that the invention is not limited to those precise embodiments. For example, the data format of FIG. 2 and the processing of FIG. 3 may be modified, so that the special bit is marked only in the first track section of the track (i.e. track section of ref. No. 201C of FIG. 2). In step 305 of FIG. 3 the processing only looks for the special bit to be marked on the first track section. While such a format may be vulnerable to attack, more than the above-described embodiment, it may nonetheless provide adequate protection against many types of unauthorized importing. Alternatively, for example, where the first and last sections of the tracks both use special bits, using more than one bit may improve control over rendering and thus decrease vulnerability to unauthorized copying. For example, the first section of a track may be marked with two special bits, while the last section is marked with one special bit. The system would then have additional data for identifying which section was a first section and which is a last section in identifying an attempt at unauthorized copying. Thus, it is intended that the scope of the invention is as defined by the scope of the appended claims.

The contents of the following three documents are also hereby incorporated by reference:

1) U.S. patent application Ser. No. 09/536,945 entitled "Protecting Content From Illicit Reproduction By Proof Of Existence Of A Complete Data Set Using Security Identifiers" by inventors Michael A. Epstein and Robert M. McDermott, filed Mar. 28, 2000.

2) U.S. patent application Ser. No. 09/537,815 entitled "Protecting Content From Illicit Reproduction By Proof Of Existence Of A Complete Data Set" by inventor Michael A. Epstein, filed Mar. 28, 2000.

3) U.S. patent application Ser. No. 09/537,079 entitled "Protecting Content From Illicit Reproduction By Proof Of Existence Of A Complete Data Set Via A Linked List" by inventors Antonius A. M. Staring and Michael A. Epstein, filed Mar. 28, 2000.

What is claimed is:

1. A method for determining the authorization of the rendering of a digital recording comprising at least one data stream to be rendered, said data stream being contained a track having a number of track sections positioned sequentially, including a first track section and a last track section, said data stream being distributed through each of said track sections, each track section including a sequence ID for identifying the sequential position of the respective track section in the track, said data stream being mixed with watermark data having at least one reserved bit corresponding to a position in each of the track sections, the reserved bit being marked in the watermark data corresponding to the first track section and the last track section, the method comprising the steps of:

a) identifying a first section and a last section of a track in the track containing the data stream to be rendered;

b) decoding a watermark from the first and last sections of the track;

c) determining if at least one reserved bit is marked in the watermark in each of the first and last sections of the track;

d) determining if sequence IDs are interposed in sections between the first and last sections of the track in sequential order;

e) providing at least a preliminary authorization of a rendering of the data sequence if the determinations in steps c and d are both positive; and f) denying a rendering of the data sequence if at least one of the determinations in steps c and d are negative.

2. The method of as claimed in claim 1, wherein the method further comprising the steps of:

rendering subsequent digital tracks that are authorized with zero time gap interposed therebetween.

* * * * *